US005491596A

United States Patent [19]
Kobori

[11] Patent Number: 5,491,596
[45] Date of Patent: Feb. 13, 1996

[54] PRESSURE-DIFFERENTIAL PASSAGEWAY FOR CLEANING A MAGNETIC DISK DRIVE

[75] Inventor: Seiki Kobori, Tokyo, Japan

[73] Assignee: NEC Corporation, Tokyo, Japan

[21] Appl. No.: 376,448

[22] Filed: Jan. 23, 1995

Related U.S. Application Data

[63] Continuation of Ser. No. 91,131, Jul. 14, 1993, abandoned.

[30] Foreign Application Priority Data

Jul. 14, 1992 [JP] Japan ................................. 4-186409

[51] Int. Cl.$^6$ ............................. G11B 33/14; G11B 5/55
[52] U.S. Cl. .................................. 360/97.03; 360/97.02; 360/106
[58] Field of Search ............................ 360/97.03, 97.02, 360/97.04, 105, 106, 103; 369/75.1, 244, 250, 255, 292

[56] References Cited

U.S. PATENT DOCUMENTS

| | | | |
|---|---|---|---|
| 4,412,261 | 10/1983 | Tateyama et al. | 360/97.03 |
| 4,429,336 | 1/1984 | Berube et al. | 360/97.03 |
| 4,471,395 | 9/1984 | Beck et al. | 360/97.03 |
| 4,626,941 | 12/1986 | Sawada et al. | 360/103 |
| 4,656,545 | 4/1987 | Kakuta | 360/97.03 |
| 4,777,549 | 10/1988 | Dushkes et al. | 360/97.03 |
| 4,780,776 | 10/1988 | Dushkes | 360/97.03 |
| 4,789,913 | 12/1988 | Gregory et al. | 360/97.03 |
| 5,325,251 | 6/1994 | Gorave et al. | 360/97.02 |

FOREIGN PATENT DOCUMENTS

| | | | |
|---|---|---|---|
| 61-151893 | 7/1986 | Japan | 360/97.02 |
| 63-070991 | 3/1988 | Japan | 360/97.02 |
| 63-211185 | 9/1988 | Japan | 360/97.02 |
| 1-033789 | 2/1989 | Japan | 360/97.02 |

OTHER PUBLICATIONS

"In–Hub Filter", IBM Technical Disclosure Bulletin, vol. 33, No. 5, pp. 318–319, Oct. 1990.

Primary Examiner—Stuart S. Levy
Assistant Examiner—Craig A. Renner
Attorney, Agent, or Firm—Sughrue, Mion, Zinn, Macpeak & Seas

[57] ABSTRACT

An air cleaning device for a magnetic disk drive and capable of removing oil mist ascribable to grease which is applied to the bearings of a head positioning mechanism. A passageway is provided between an area generally defined by the neighborhood of the disks and a second area generally defined by the vicinity of the head positioning mechanism. Pressure differential is generated within the passageway upon rotation of the disk. The pressure differential causes air to flow from the second area, through the passageway, and into the first area. A filter captures oil mist entrained by the flowing air.

5 Claims, 3 Drawing Sheets

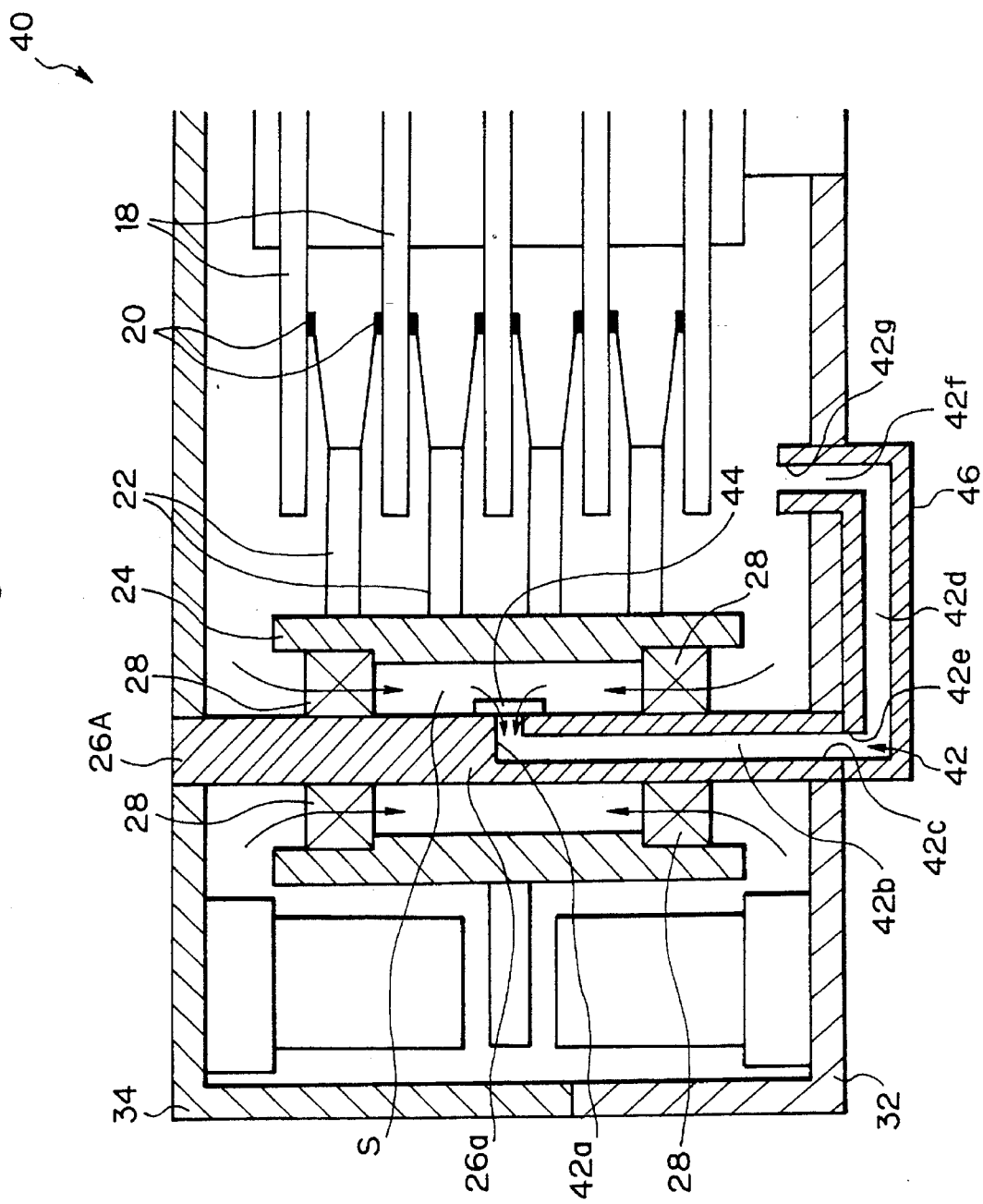

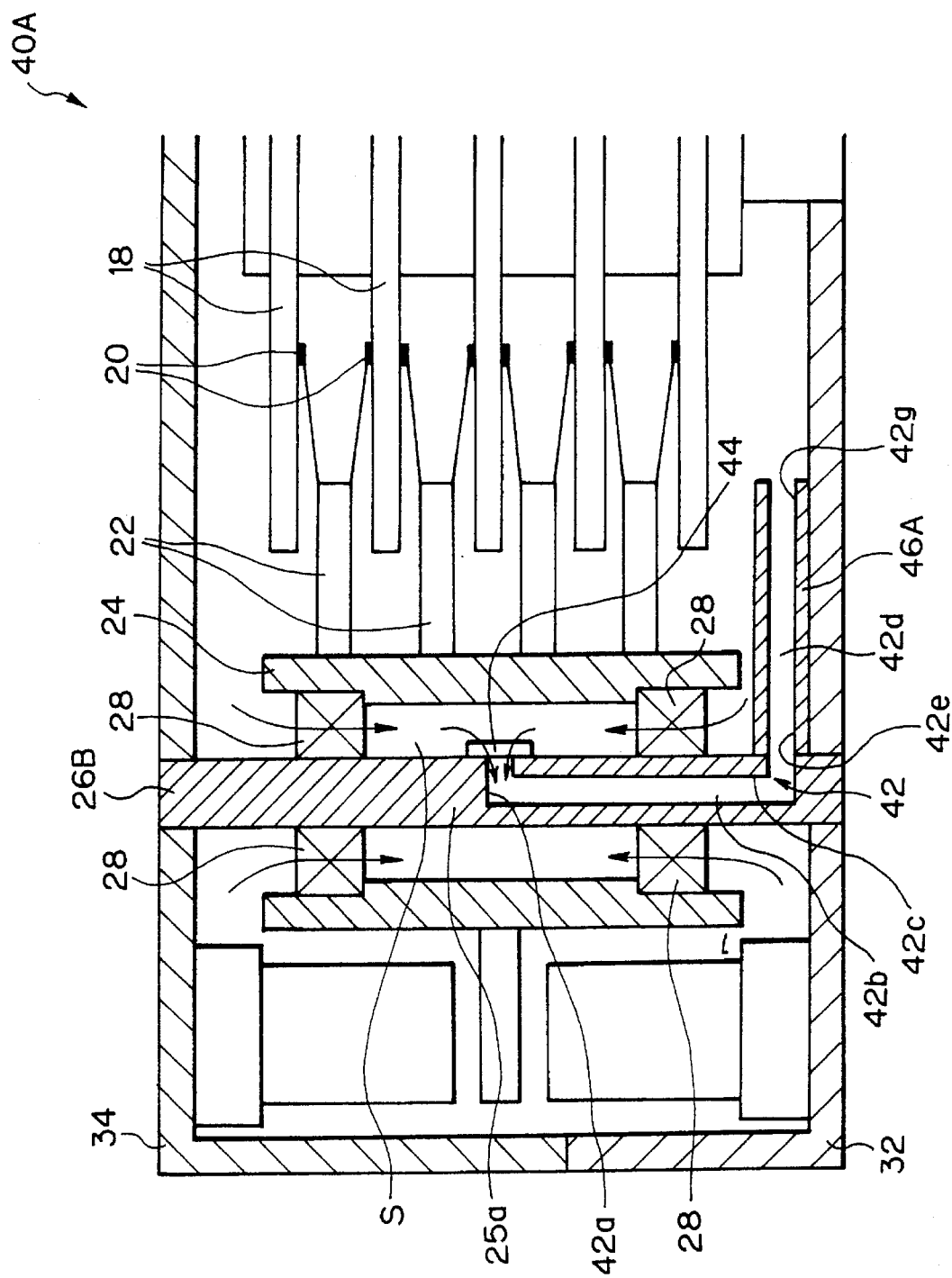

PRESSURE-DIFFERENTIAL PASSAGEWAY FOR CLEANING A MAGNETIC DISK DRIVE

This is a Continuation of application Ser. No. 08/091,131, filed Jul. 14, 1993, now abandoned.

BACKGROUND OF THE INVENTION

The present invention relates to a magnetic disk drive and, more particularly, to an air cleaning device for removing oil mist which is ascribable to grease applied to the bearings of a head positioning mechanism.

A magnetic disk drive includes a head positioning mechanism for locating a magnetic head at a predetermined track of a magnetic disk. The head positioning mechanism is usually made up of arms each carrying a magnetic head at one end thereof, an arm holder supporting the other end of the arms, a shaft supporting the arm holder, and bearings intervening between the shaft and the arm holder. Grease is applied to the surfaces of the bearings. Such a conventional disk drive has the following problem. When the positioning mechanism brings any one of the heads to a desired position, the bearings interposed between the shaft and the arm holder are rotated. Then, it is likely that the grease on the surfaces of the bearings is scattered around to form oil mist. The oil mist is apt to deposit on and damage the disks and heads, degrading the reliability of the disk drive.

SUMMARY OF THE INVENTION

It is therefore an object of the present invention to provide an air cleaning device for a magnetic disk drive and capable of removing oil mist ascribable to grease which is applied to the bearings of a head positioning mechanism.

In accordance with the present invention, an air cleaning device is incorporated in a magnetic disk drive having a head positioning mechanism constituted by arms attached to an arm holder, a shaft supporting the arm holder, and bearings interposed between the arm holder and the shaft. The invention comprises a passageway providing fluid communication between a space delimited by the arm holder, shaft, and bearings and the area generally defined by the neighborhood of the magnetic disks, and a filter located at a predetermined position of the passageway.

BRIEF DESCRIPTION OF THE DRAWINGS

The above and other objects, features and advantages of the present invention will become more apparent from the following detailed description taken with the accompanying drawings in which:

FIG. 3 is an enlarged section of the air cleaning device shown in FIG. 2; and

FIG. 4 is a section showing a modified form of the embodiment.

DESCRIPTION OF THE PREFERRED EMBODIMENTS

Figure 1:
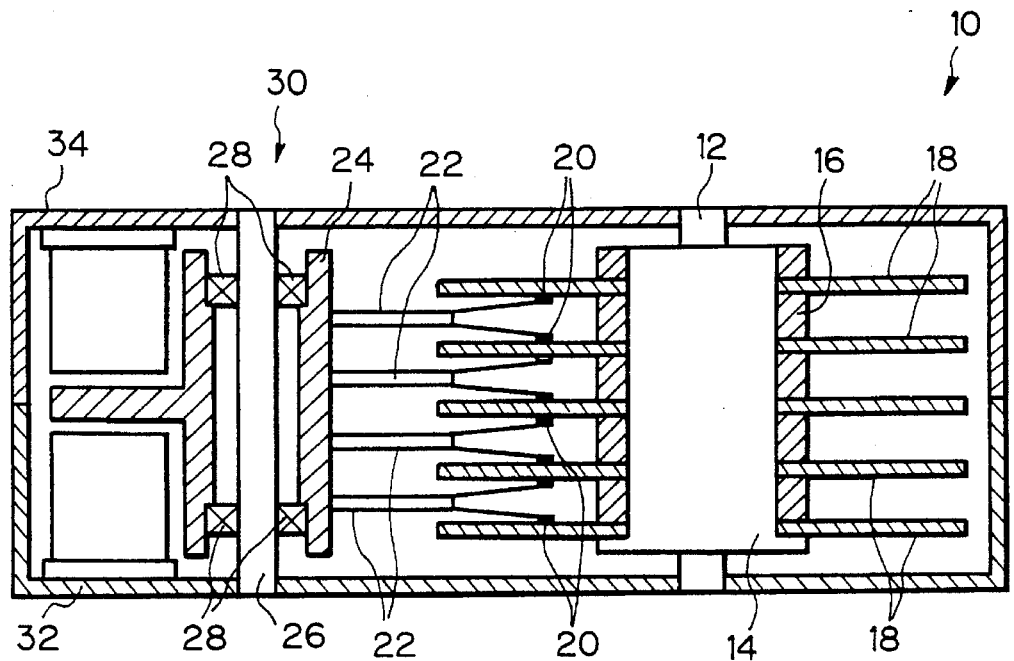
FIG. 1 is a section showing a conventional magnetic disk drive.

To better understand the present invention, a brief reference will be made to a prior art magnetic disk drive, shown in FIG. 1. As shown, the disk drive, generally 10, has a stationary shaft 12, a spindle hub 14 mounted on the shaft 12, and a stack of magnetic disks 18 supported by the spindle hub 14 via annular spacers, or spacer rings, 16. A plurality of magnetic heads 20 each faces the surface of a particular disk 18 for writing and reading data out of the disk 18. A head positioning mechanism 30 positions each head 20 at a desired track of the associated disk 18. The mechanism 30 is made up of arms 22 each carrying the heads 20 at one end thereof, an arm holder 24 supporting the arms 22, a shaft 26 supporting the arm holder 24, and bearings 28 intervening between the shaft 26 and the arm holder 24. Such components are mounted on a casing constituted by a base 32 and a cover 34. Grease is applied to the surfaces of the bearings 28.

When the positioning mechanism 30 brings any one of the heads 20 to a desired position, the bearings 28 interposed between the shaft 26 and the arm holder 24 are rotated. In this condition, it is likely that the grease on the surfaces of the bearings 28 is scattered around to form oil mist. The oil mist is apt to deposit on and damage the disks 18 and heads 20, degrading the reliability of the disk drive 10.

Figure 2:
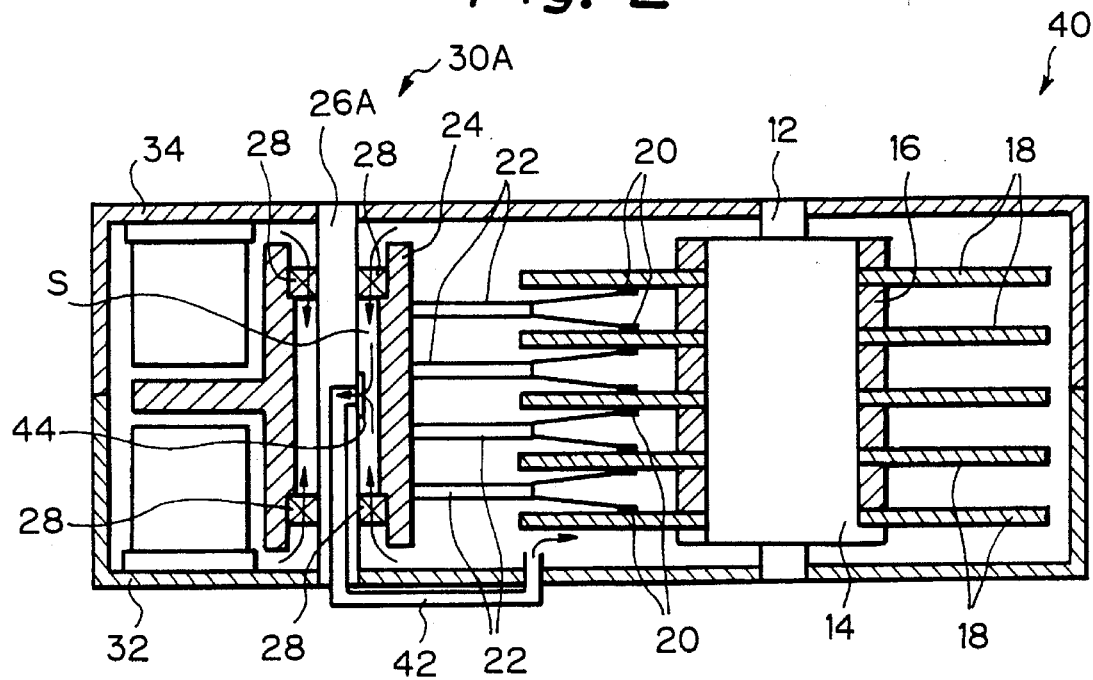
FIG. 2 is a section of a magnetic disk drive to which an air cleaning device embodying the present invention is applied.

Referring to FIG. 2, a magnetic disk drive is shown to which an air cleaning device embodying the present invention is applied. In FIG. 2, the same constituent parts as the parts shown in FIG. 1 are designated by the same reference numerals. As shown, the disk drive, generally 40, also has a stationary shaft 12, a spindle hub 14 mounted on the shaft 12, and a stack of magnetic disks 18 supported by the spindle hub 14 via annular spacers 16. A plurality of magnetic heads 20 each faces the surface of a particular disk 18 for writing and reading data out of the disk 18. A head positioning mechanism 30A positions each head 20 at a desired track of the associated disk 18. The mechanism 30A is made up of arms 22 each carrying the heads 20 at one end thereof, an arm holder 24 supporting the arms 22, a shaft 26A supporting the arm holder 24, and bearings 28 intervening between the shaft 26A and the arm holder 24. The shaft 26A has a body portion 26a accommodated in the casing of the disk drive 40. A passageway 42 provides fluid communication between a space S delimited by the arm holder 24, bearings 28 and shaft 26A and the neighborhood of the disks 18. A filter 44 is fitted on one end of the passageway 42.

Specifically, as shown in FIG. 3, the passageway 42 extends from an opening 42a formed in the shaft 26A and communicating to the space S. A bore, or first passageway, 42b is formed by boring the body portion 26a of the shaft 26A. The first passageway 42b is communicated to the opening 42a at one end and provided with an opening 42c at the other end. A bent tube 46 is fitted on the outer periphery of a base 32 and forms a second passageway 42d having an opening 42e communicating to the opening 42c of the first passageway 42b. The second passageway 42d merges into a third passageway 42f also formed in the tube 46 and provided with an opening 42g open to the interior of the casing, i.e., the neighborhood of the disks 18. The filter 44 covers the opening 42a to isolate the opening 42a from the space S.

In operation, as the disks 18 are rotated, vacuum is generated around the disks 18 with the result that a pressure difference occurs between opposite ends of the passageway 42, i.e., between the openings 42a and 42g. In this condition, air flows into the passageway 42, i.e., the first to third passageways 42b, 42d and 42f via the filter 44 and then flows out to the vicinity of the disks 18. Consequently, oil mist due to the grease applied to the bearings 28 is captured by the filter 44. Therefore, the air coming out of the passageway 42 via the opening or outlet 42g does not contain oil mist at all.

FIG. 4 shows a modification of the above embodiment, particularly a modified form of the passageway 42 as embodied in disk drive 40A. As shown, the bent pipe 46 is replaced with a straight pipe 46A located within the casing and forming the second passageway 42d. One end 42e of the second passageway 42d is communicated to the opening 42c of the first passageway 42b which is formed in the body portion 25a of shaft 26B. The other end 42g of the passageway 42d is open to the space around the disks 18. Since the passageway 42 is formed within the casing, the modification implements a more compact and easier-to-machine configuration than the previous embodiment.

In summary, it will be seen that the present invention provides an air cleaning device which enhances the reliability of a magnetic disk drive by preventing oil mist from bearings from depositing on disks and heads.

Various modifications will become possible for those skilled in the art after receiving the teachings of the present disclosure without departing from the scope thereof.

What is claimed is:

1. An air cleaning device in a magnetic disk drive having a spindle hub supporting a plurality of magnetic disks, a head positioning mechanism constituted by a plurality of arms disposed in a casing of said magnetic disk drive, each of said arms carrying a magnetic head at one end, an arm holder supporting the other end of each of said arms, a shaft supporting said arm holder, and bearings interposed between said arm holder and said shaft to rotatably support said arm holder, said air cleaning device comprising:

a passageway providing fluid communication, through an interior bore of said shaft, between a first area delimited by the arm holder, the shaft, and the bearings and a second area generally defined by the neighborhood of the magnetic disks, said passageway having an opening disposed in close proximity to a surface of a selected one of said magnetic disks at a location radially remote from said spindle hub to thereby define a gap between said opening and said selected magnetic disk; and a filter located at a predetermined position of said passageway;

wherein, rotation of said selected magnetic disk creates a low atmospheric pressure in said gap to thereby induce suction through said opening to cause a fluid motion from said first area to said second area through said filter to capture grease generated oil mist and other contaminants from the first area, and prevent the oil mist and the other contaminants from passing into the second area along with the fluid motion.

2. A device as claimed in claim 1, wherein said passageway comprises:

a first passageway formed in the shaft and having an opening open to said first area;

a second passageway communicating to said first passageway and formed in a bent pipe which is fitted on an outer periphery of the casing and connected to the shaft; and a third passageway formed in said bent pipe and communicating to said second passageway and said second area.

3. A device as claimed in claim 2, wherein said filter covers said opening open to said first area.

4. A device as claimed in claim 1, wherein said passageway comprises:

a first passageway formed in said shaft and having an opening open to said first area; and a second passageway communicating to said first passageway and the neighborhood of the magnetic disks and formed in a straight pipe connected to said shaft.

5. A device as claimed in claim 4, wherein said filter covers said opening open to said first area.

\* \* \* \* \*